US011915848B2

(12) United States Patent
Yen et al.

(10) Patent No.: US 11,915,848 B2
(45) Date of Patent: Feb. 27, 2024

(54) INDUCTOR DEVICE

(71) Applicant: Realtek Semiconductor Corporation, Hsinchu (TW)

(72) Inventors: Hsiao-Tsung Yen, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 499 days.

(21) Appl. No.: 17/073,966

(22) Filed: Oct. 19, 2020

(65) Prior Publication Data

US 2022/0068539 A1 Mar. 3, 2022

(30) Foreign Application Priority Data

Aug. 25, 2020 (TW) ................................ 109128971

(51) Int. Cl.

*H01F 27/28* (2006.01)
*H01F 17/00* (2006.01)
*H01F 27/29* (2006.01)

(52) U.S. Cl.

CPC ..... *H01F 17/0006* (2013.01); *H01F 27/2823* (2013.01); *H01F 27/29* (2013.01); *H01F 2017/0073* (2013.01)

(58) Field of Classification Search

CPC .................................................. H01F 27/2823
USPC ........................................................ 336/200
See application file for complete search history.

(56) References Cited

U.S. PATENT DOCUMENTS

| | | | | |
|---|---|---|---|---|
| 10,153,078 | B2 | 12/2018 | Yen et al. | |
| 2011/0032067 | A1* | 2/2011 | Le Guillou | H01F 27/346 336/200 |
| 2019/0221350 | A1* | 7/2019 | Yen | H01F 27/2804 |
| 2020/0312511 | A1 | 10/2020 | Yen et al. | |
| 2020/0312512 | A1 | 10/2020 | Yen et al. | |
| 2020/0312521 | A1 | 10/2020 | Yen et al. | |
| 2020/0312530 | A1 | 10/2020 | Yen et al. | |

FOREIGN PATENT DOCUMENTS

| | | | |
|---|---|---|---|
| TW | I591800 | B | 7/2017 |
| TW | 201806112 | A | 2/2018 |
| TW | 201933384 | A | 8/2019 |
| TW | I692780 | B | 5/2020 |
| TW | I694475 | B | 5/2020 |
| TW | I703588 | B | 9/2020 |
| TW | I703591 | B | 9/2020 |
| TW | I703592 | B | 9/2020 |
| WO | 2009101565 | A1 | 8/2009 |

* cited by examiner

*Primary Examiner* — Ronald Hinson
(74) *Attorney, Agent, or Firm* — Locke Lord LLP; Tim Tingkang Xia, Esq.

(57) ABSTRACT

An inductor device includes an 8-shaped inductor structure, a first spiral wire, a first connector, a second connector, and a first interlaced component. The 8-shaped inductor structure includes two first-wires and two second-wires. The first spiral wire is disposed on an inner side of the two first-wires. The first connector is coupled to one of the two first-wires and one of the two second-wires. The second connector is coupled to another one of the two first-wires. The first interlaced component is coupled to the first spiral wire and another one of the two second-wires, and the first interlaced component is coupled to the first connector and the second connector in an interlaced manner respectively.

19 Claims, 4 Drawing Sheets

3

INDUCTOR DEVICE

CROSS-REFERENCE TO RELATED APPLICATION

This application claims priority to and the benefit of Taiwan Application Serial Number 109128971, filed on Aug. 25, 2020, the entire content of which is incorporated herein by reference as if fully set forth below in its entirety and for all applicable purposes.

BACKGROUND

Field of Disclosure

The disclosure generally relates to electric devices, and more particularly, to inductor devices.

Description of Related Art

The various types of inductors according to the prior art have their advantages and disadvantages. For example, the 8-shaped inductor has two sets of coils which sense the current respectively in a different direction such that the inductance is offset. Therefore, the coupling between the 8-shaped inductor and another object which is a magnetic source occurs at a small probability. However, an eight-shaped inductor occupies a larger area in a device and its quality factor is low, and its parasitic capacitance is large. The double spiral series inductor has a high-quality factor (Q value) and a large mutual inductance, however, the shape of the double spiral series inductor is asymmetric and the ability to prevent from the outside interference is worse than the 8-shaped inductor. Accordingly, the application ranges of the above inductors are all limited.

SUMMARY

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

The present disclosure of an embodiment provides an inductor device includes an 8-shaped inductor structure, a first spiral wire, a first connector, a second connector, and a first interlaced component. The 8-shaped inductor structure includes two first-wires and two second-wires. The first spiral wire is disposed on an inner side of the two first-wire. The first connector is coupled to one of the two first-wires and one of the two second-wires. The second connector is coupled to another one of the two first-wires. The first interlaced component is coupled to the first spiral wire and another one of the two second-wires, and the first interlaced component is coupled to the first connector and the second connector in an interlaced manner respectively.

One aspect of the present disclosure is to provide an inductor device includes an 8-shaped inductor structure, a first spiral wire, a second spiral wire, a first interlaced component, a second interlaced component, and a connector. The 8-shaped inductor structure includes two first-wires and two second-wires. The first spiral wire is disposed on an inner side of the two first-wire. The second spiral wire is disposed on an inner side of the two second-wires, and the second spiral wire is coupled to one of the two second-wires. The first interlaced component is coupled to one of the two first-wires and the second spiral wire. The second interlaced component is coupled to another one of the two first-wires and the first spiral wire. The connector is coupled to another one of the two second-wires and the first spiral wire, and the connector is coupled to the first interlaced component and the second interlaced component in an interlaced manner respectively.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

DETAILED DESCRIPTION

Figure 2:
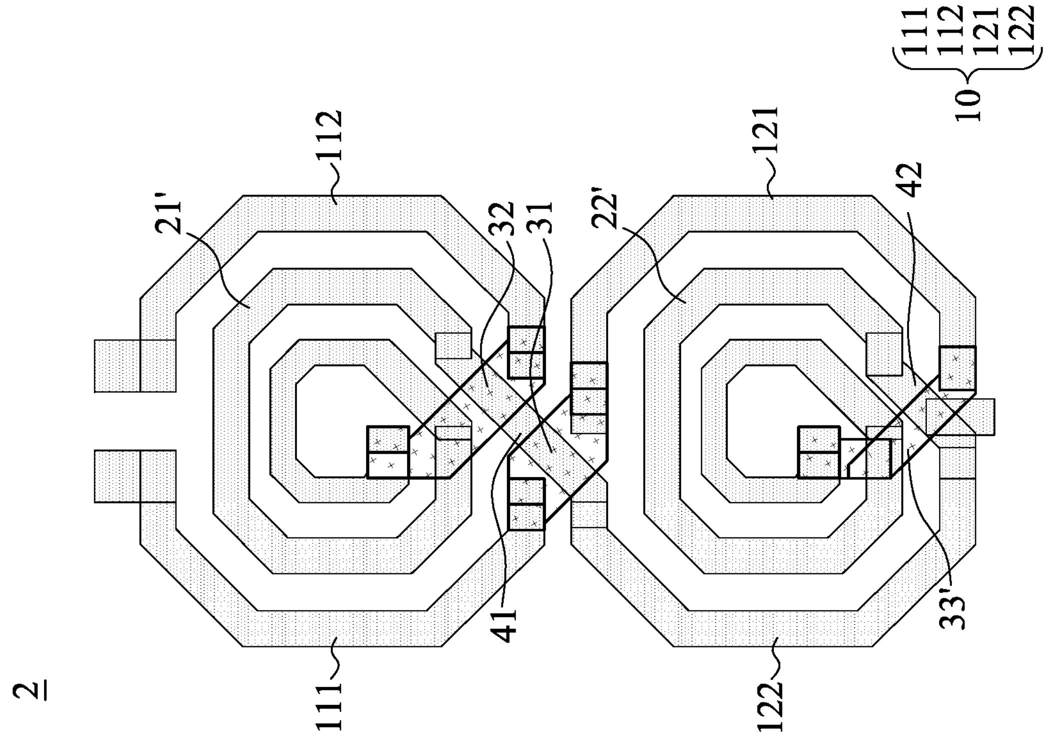
FIG. 2 depicts a diagram of an inductor device according to some embodiments of the present disclosure.

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Reference will now be made in detail to the present embodiments of the disclosure, examples of which are illustrated in the accompanying drawings. Wherever possible, the same reference numbers are used in the drawings and the description to refer to the same or like parts.

Figure 1:
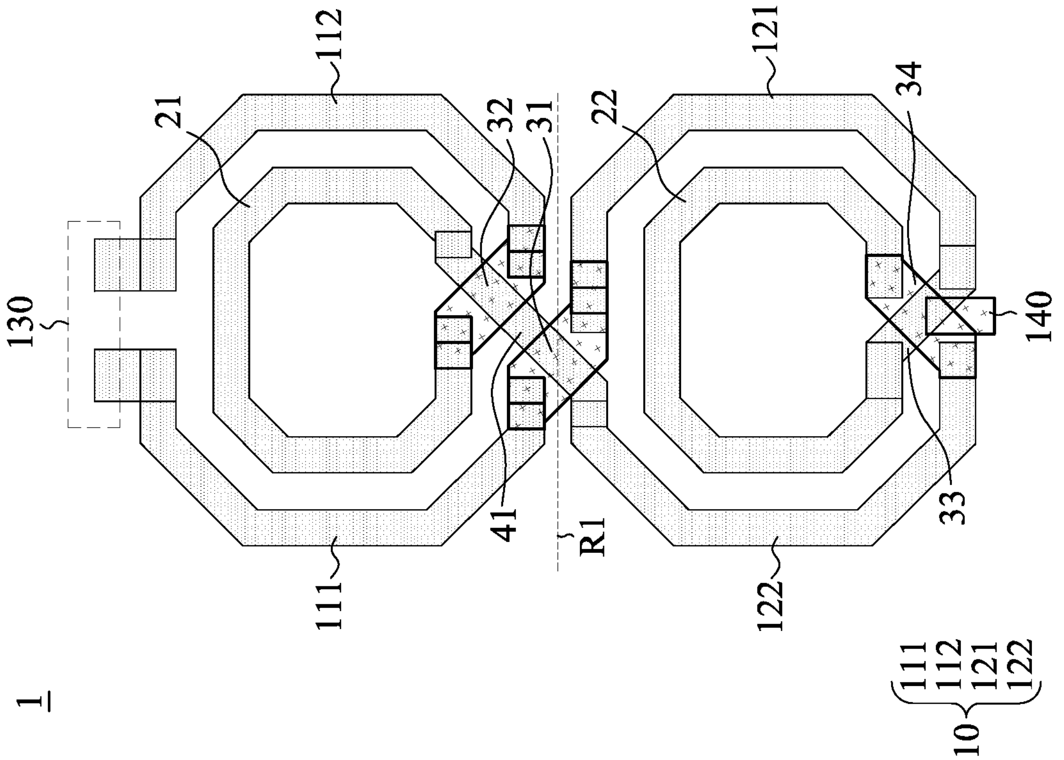
FIG. 1 depicts a diagram of an inductor device according to some embodiments of the present disclosure.

Reference is made to FIG. 1. FIG. 1 depicts a diagram of an inductor device 1 according to some embodiments of the present disclosure. As shown in FIG. 1, the inductor device 1 includes an 8-shaped inductor structure 10, a first spiral wire 21, and a second spiral wire 22. The 8-shaped inductor structure 10 includes two first-wires 111 and 112 and two second-wires 121 and 122. The first spiral wire 21 is disposed an inner side of the first-wires 111 and 112. The second spiral wire 22 is disposed on an inner side of the second-wires 121 and 122.

As shown in FIG. 1, the first-wire 111 is coupled to the second-wire 121 through a first connector 31. The first-wire 112 is coupled to the first spiral wire 21 through a second connector 32. The first spiral wire 21 is coupled to the second-wire 122 through a first interlaced component 41. The second-wires 121 and 122 are coupled to the second spiral wire 22 through a third connector 33 and a fourth connector 34 respectively. The first interlaced component 41 is interlaced with the first connector 31 and the second connector 32 respectively.

In some embodiments, the 8-shaped inductor structure 10, the first interlaced component 41, the first spiral wire 21, and the second spiral wire 22 are disposed on a first layer. The first connector 31, the second connector 32, the third connector 33, and the fourth connector 34 are disposed on a second layer. The first layer is different from the first layer.

As shown in FIG. 1, the first-wires 111 and 112 is a duplicated projection if the second-wires 121 and 122 based on an imaginary line R1. The first spiral wire 21 is a duplicated projection of the second spiral wire 22 based on the imaginary line R1.

In some embodiments, an input terminal 130 is disposed on a first side of the first-wires 111 and 112. The first connector 31 and the second connector 32 are disposed on a second side of the first-wires 111 and 112. The first side of the first-wires 111 and 112 is opposite to the second side of the first-wires 111 and 112. For example, the first side is the upper side of the top view of the first-wires 111 and 112, and the second side of the first-wires 111 and 112 is the lower side of the top view of the first-wires 111 and 112.

In some embodiments, the first connector 31 is disposed on a first side of the second-wires 121 and 122. The third connector 33 and the fourth connector 34 are disposed on a second side of the second-wires 121 and 122. For example, the first side of the second-wires 121 and 122 is the upper side of the top view of the second-wires 121 and 122, and the second side of the second-wires 121 and 122 is the lower side of the top view of the second-wires 121 and 122.

In some embodiments, the first spiral wire 21 and the second spiral wire 22 include one or more circles. FIG. 1 illustrates an embodiment of one circle.

In some embodiments, the input terminal 130, the first connector 31, the second connector 32, the third connector 33, and the fourth connector 34 are approximately aligned along a configured line (not shown) which is verticle to the imaginary line R1. As shown in FIG. 1, the first connector 31, the second connector 32, the third connector 33, and the fourth connector 34 are disposed and arranged from the upper side to the lower side of the top view of the inductor device 1, rather than disposed on the left or right hand side of the first-wires 111 and 112 and/or the second-wires 121 and 122.

In some embodiments, the inductor device 1 includes a center-tap terminal 140. As shown in FIG. 1, the center-tap terminal 140 is disposed on an interlaced portion of the third connector 33 and the fourth connector 34. In some embodiments, the third connector 33 and the fourth connector 34 are disposed on different layers. The center-tap terminal 140 can be disposed on the layer the same with the third connector 33 or the layer the same with the fourth connector 34.

Reference is made to FIG. 2. FIG. 2 depicts a diagram of an inductor device 2 according to some embodiments of the present disclosure. The elements shown in FIG. 2, whose numbers are the same as the numbers of the elements shown in FIG. 1, have the same connections, functions or related descriptions in connection with those elements shown in FIG. 1, and the connections, functions or related descriptions regarding the elements shown in FIG. 2 will be omitted here for the sake of brevity.

As shown in FIG. 2, the inductor device 2 includes the 8-shaped inductor structure 10, a first spiral wire 21' and a second spiral wire 22'. The 8-shaped inductor structure 10 includes the two first-wires 111 and 112 and the two second-wires 121 and 122. The first spiral wire 21' and the second spiral wire 22' include the spiral wire which is more than one circle. The first spiral wire 21' is disposed on an inner side of the first-wires 111 and 112. The second spiral wire 22' is disposed on an inner side of the second-wires 121 and 122.

In some embodiments, because the circle number of the first spiral wire 21' is more than one circle, the second connector 32 is partially overlapped on or below the first spiral wire 21' to connect with a terminal which is at the inner most circle of the first spiral wire 21'.

As shown in FIG. 2, the second-wire 121 is coupled to the second spiral wire 22' through a third connector 33'. The second spiral wire 22' is coupled to the second-wire 122 through a second interlaced component 42. Similarly, because the circle number of the second spiral wire 22' is more than one circle, the third connector 33' is partially overlapped on or below the second spiral wire 22' to connect with a terminal which is at the inner most circle of the second spiral wire 22'.

In some embodiments, the first spiral wire 21' and the second spiral wire 22' include one or more circles. FIG. 2 takes multiple circles as an embodiment for illustration. Therefore in the structure, when the circle number of the spiral wire in the 8-shaped inductor structure increase, the inductance value of the inductor device 2 increases consequentially.

Figure 3:
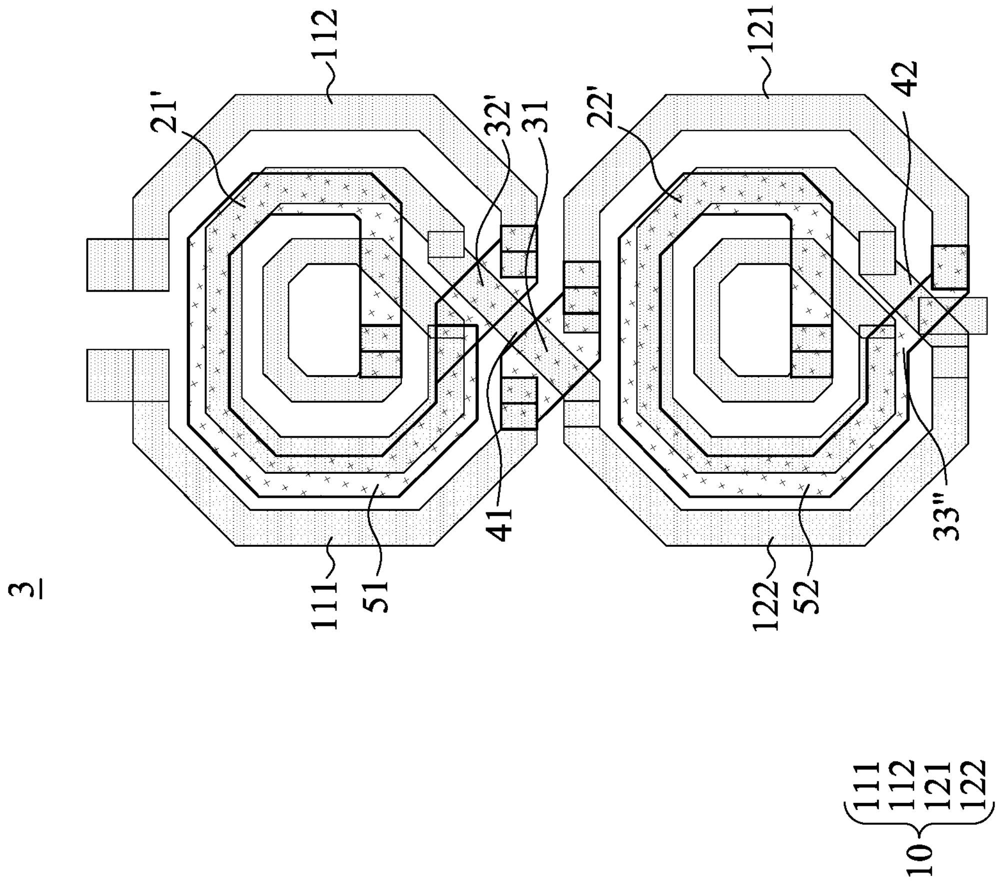
FIG. 3 depicts a diagram of an inductor device according to some embodiments of the present disclosure.

Reference is made to FIG. 3. FIG. 3 depicts a diagram of an inductor device 3 according to some embodiments of the present disclosure. The elements shown in FIG. 3, whose numbers are the same as the numbers of the elements shown in FIG. 1 and FIG. 2, have the same connections, functions or related descriptions in connection with those elements shown in FIG. 1 and FIG. 2, and the connections, functions or related descriptions regarding the elements shown in FIG. 3 will be omitted here for the sake of brevity.

As shown in FIG. 3, the inductor device 1 includes the 8-shaped inductor structure 10, the first spiral wire 21', the second spiral wire 22', a third spiral wire 51, and a fourth spiral wire 52. The third spiral wire 51 is disposed on or below the first spiral wire 21' and partially overlapped with the first spiral wire 21'. The fourth spiral wire 52 is disposed on or below the second spiral wire 22' and partially overlapped with the second spiral wire 22'.

Comparing with the inductor device 2 in FIG. 2 whose second connector 32 is coupled to the first spiral wire 21', the inductor device 3 in FIG. 3 whose second connector 32' is coupled to the third spiral wire 51. As shown in FIG. 3, the first-wire 112 is coupled to a first terminal of the third spiral wire 51 through the second connector 32'. In the top-view direction of the inductor device 3, a second terminal of the third spiral wire 51 is coupled to the first spiral wire 21' through a vertical connector (e.g., a via).

Comparing with the inductor device 2 in FIG. 2 whose third connector 33' is coupled to the second spiral wire 22', the inductor device 3 in FIG. 3 whose third connector 33" is coupled to the fourth spiral wire 52. As shown in FIG. 3, the second-wire 121 is coupled to a first terminal of the fourth spiral wire 52 through the third connector 33". In the top-view direction of the inductor device 3, a second terminal of the fourth spiral wire 52 is coupled to the fourth spiral wire 22' through a vertical connector.

In some embodiments, the 8-shaped inductor structure 10, the first spiral wire 21', the first interlaced component 41, the second spiral wire 22', and the second interlaced component 42 are disposed on a first layer. The third spiral wire 51, the first connector 31, the second connector 32', the fourth spiral wire 52, and the third connector 33' are disposed on a second layer. The first layer is different from the first layer.

Figure 4:
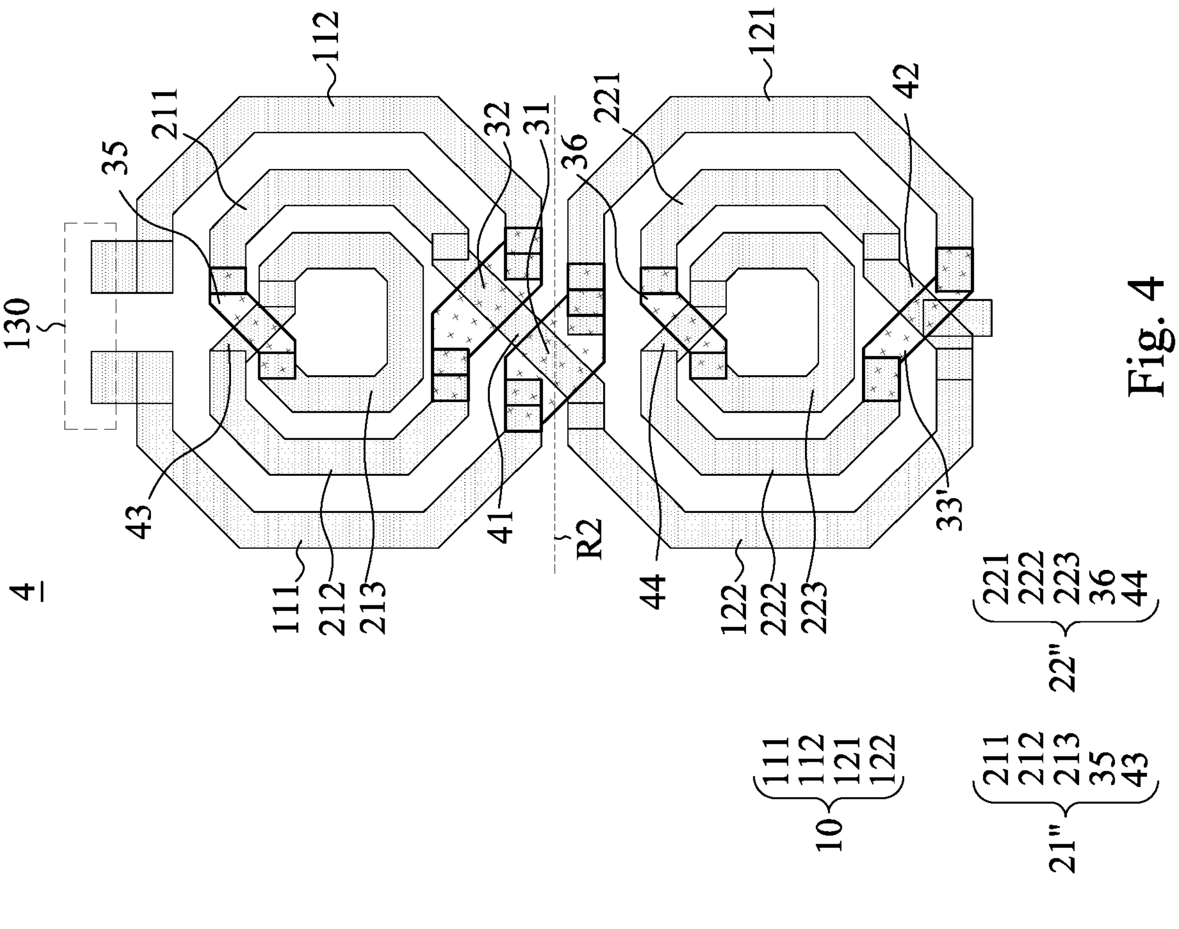
FIG. 4 depicts a diagram of an inductor device according to some embodiments of the present disclosure.

Reference is made to FIG. 4. FIG. 4 depicts a diagram of an inductor device 4 according to some embodiments of the present disclosure. As shown in FIG. 4, the inductor device 4 includes the 8-shaped inductor structure 10, a first spiral wire 21", and a second spiral wire 22". The 8-shaped inductor structure 10 includes the two first-wires 111 and 112 and the two second-wires 121 and 122. The first spiral wire 21" is disposed on an inner side of the first-wires 111 and 112. The second spiral wire 22" is disposed on an inner side of the second-wires 121 and 122.

The spiral structure of the inductor device 4 is different from the spiral structure of the inductor device 1. As shown in FIG. 4, the first spiral wire 21" includes sub-spiral wires 211, 212, and 213. The sub-spiral wire 211 is coupled to the second-wire 122 through the first interlaced component 41. The sub-spiral wire 212 is coupled to the first-wire 112 through the second connector 32. The sub-spiral wire 213 is coupled to the sub-spiral wire 211 through a fifth connector 35 and coupled to the sub-spiral wire 212 through an interlaced component 43. In the embodiment, the interlaced component 43 is coupled with the fifth connector 35 in the upper side of the top view of the first spiral wire 21" in an interlaced manner.

As shown in FIG. 4, the second spiral wire 22" includes sub-spiral wires 221, 222, and 213. The sub-spiral wire 221 is coupled to the second-wire 122 through the second interlaced component 42. The sub-spiral wire 222 is coupled to the second-wire 121 through the third connector 33'. The sub-spiral wire 223 is coupled to the sub-spiral wire 221 through a sixth connector 36 and coupled to the sub-spiral wire 222 through a fourth interlaced component 44. In the embodiment, the fourth interlaced component 44 is coupled with the sixth connector 36 on the upper side of the top view of the second spiral wire 22" in an interlaced manner.

As shown in FIG. 4, the first-wires 111 and 112 are the duplicate projection of the second-wires 121 and 122 based on an imaginary line R2. The first spiral wire 21" is a duplicate projection of the second spiral wire 22" based on the imaginary line R2.

The inductor device 4 includes the input terminal 130. The input terminal 130 is disposed on the upper side of the top view of the first-wires 111 and 112. In some embodiments, the input terminal 130, the first connector 31, the second connector 32, the third connector 33', the fifth connector 35, and the sixth connector 36 are approximately aligned along a configured line (not shown) which is vertical to the imaginary line R2.

Figure 5:
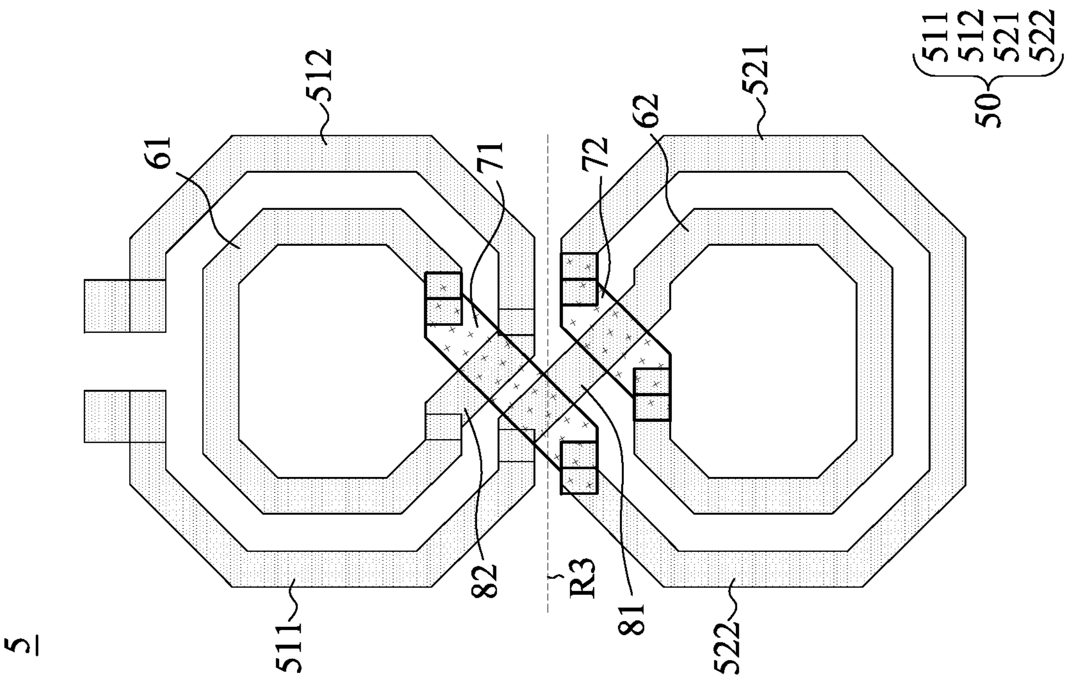
FIG. 5 depicts a diagram of an inductor device according to some embodiments of the present disclosure.

Reference is made to FIG. 5. FIG. 5 depicts a diagram of an inductor device 5 according to some embodiments of the present disclosure. As shown in FIG. 5, the inductor device 5 includes an 8-shaped inductor structure 50, a first spiral wire 61, and a second spiral wire 62. The 8-shaped inductor structure 50 includes two first-wires 511 and 512 and two second-wires 521 and 522. The first spiral wire 61 is disposed on an inner side of the first-wires 511 and 512. The second spiral wire 62 is disposed on an inner side of the second-wires 621 and 622.

As shown in FIG. 5, the first-wire 511 is coupled to the second spiral wire 62 through a first interlaced component 81. The first-wire 512 is coupled to the first spiral wire 61 through a second interlaced component 82. The first spiral wire 61 is coupled to the second-wire 522 through the first connector 71. The second-wire 522 is coupled to the second spiral wire 62 through a second connector 72. The first interlaced components 11 and 82 are interlaced with the first connector 71 and the second connector 72 respectively.

In some embodiments, the 8-shaped inductor structure 50, the first interlaced component 81, the second interlaced component 82, the first spiral wire 61, and the second spiral wire 62 are disposed on a first layer. The first connector 71 and the second connector 72 are disposed on a second layer. The first layer is different from the first layer.

As shown in FIG. 5, the first-wires 511 and 512 are a mirror of the second-wires 521 and 522 based on an imaginary line R3. The first spiral wire 21 is a mirror of the second spiral wire 22 based on the imaginary line R3.

Figure 6:
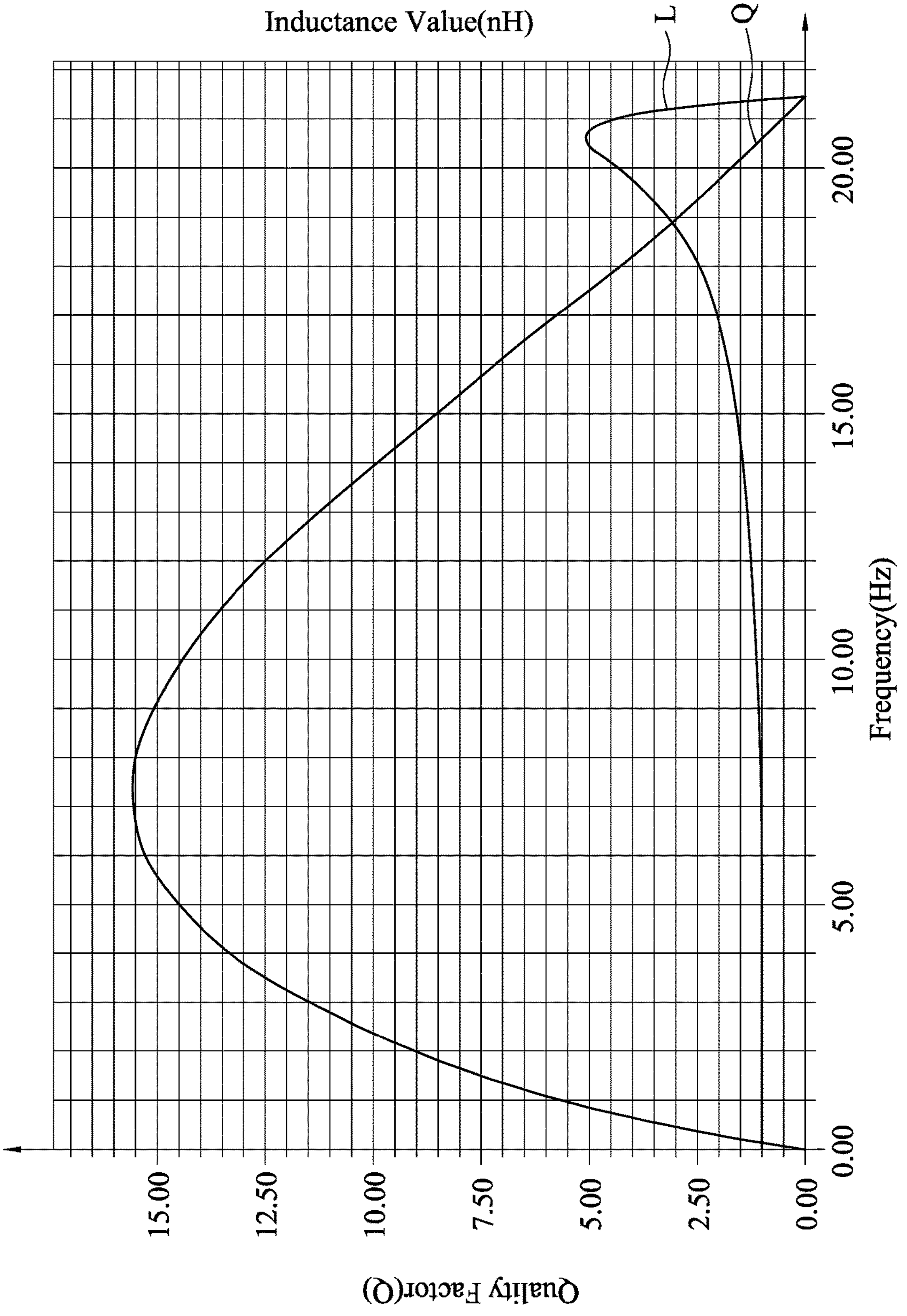
FIG. 6 depicts a schematic diagram of the experimental data of an inductor device according to some embodiment of the present disclosure.

Reference is made to FIG. 6. FIG. 6 depicts a schematic diagram of the experimental data of an inductor device according to some embodiment of the present disclosure. As shown in FIG. 6, the experimental curve of the quality factor of the inductor device adopting the structural configuration of the present disclosure is Q and the experimental curve of the inductance value is L, and the value of the curve L (i.e., the inductance value nH) is referred to as the value of the curve Q (i.e., the quality factor, as the Y-axis value on the left side shown in FIG. 6). As can be seen from FIG. 6, the inductor device adopting the structure of the present disclosure has a good inductance value per unit area. For example, the inductance value is about 1.11 at the frequency 7 GHz of the curve L and the quality factor is about 17.85 at the frequency 7 GHz of the curve Q when the area of the inductor device is (or smaller than) 12 um*8 um or 14 um*8 um. Furthermore, as shown in curve L, the inductance value is about 1.14 nH at the frequency 8 GHz, and the quality factor is about 17.77 as shown in curve Q.

It can be understood from the embodiments of the present disclosure that the application of the present disclosure has the following advantages. The inductance value generated between the 8-shaped inductor structure and the spiral wires, for example in FIG. 1, the portion between the left side of the first-wire 111 and the left side of the first spiral wire 21, and the portion between the left side of the second-wire 121 and the left side of the second spiral wire 22. The inductor device of the present disclosure has the symmetric structure and the coupling occurs on the left and right sides and the upper and lower sides of the inductor device. Accordingly, the inductor device of the present disclosure has good inductance value per unit area.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An inductor device, comprising:

an 8-shaped inductor structure comprising two first-wires and two second-wires, wherein the two first-wires are a duplicated projection of the two second-wires based on a horizontal imaginary line which is a junction of the two first-wires and the two second-wires;

a first spiral wire disposed on an inner side of the two first-wires;

a first connector coupled to one of the two first-wires and one of the two second-wires;

a second connector coupled to another one of the two first-wires and the first spiral wire; and a first interlaced component coupled to the first spiral wire and another one of the two second-wires, wherein the first interlaced component is arranged with the first connector and the second connector in an interlaced manner respectively.

2. The inductor device of claim 1, wherein the another one of the two first-wires is coupled to the first spiral wire through the second connector.

3. The inductor device of claim 1, further comprising:

a third spiral wire disposed on or below the first spiral wire, wherein the third spiral wire is coupled to the first spiral wire.

4. The inductor device of claim 3, wherein the one of the two first-wires is coupled to the third spiral wire through the second connector.

5. The inductor device of claim 2, further comprising:

a second spiral wire disposed on an inner side of the two second-wires.

6. The inductor device of claim 5, wherein the first spiral wire comprises one or more wires.

7. The inductor device of claim 6, wherein the second spiral wire comprises one or more wires.

8. The inductor device of claim 5, further comprising:

a third connector coupled to the one of the two second-wires.

9. The inductor device of claim 8, further comprising:

a fourth spiral wire disposed on or below the second spiral wire, wherein the fourth spiral wire is coupled to the second spiral wire.

10. The inductor device of claim 9, wherein the one of the two second-wires is coupled to the fourth spiral wire through the third connector.

11. The inductor device of claim 10, further comprising:

a second interlaced component coupled to the another one of the two second-wires and the second spiral wire.

12. The inductor device of claim 8, wherein the one of the two second-wires is coupled to the second spiral wire through the third connector.

13. The inductor device of claim 12, further comprising:

a fourth connector coupled to the another one of the two second-wires.

14. The inductor device of claim 13, wherein the another one of the two second-wires is coupled to the second spiral wire through the fourth connector.

15. The inductor device of claim 13, further comprising:

an input terminal disposed on a first side of the two first-wires.

16. The inductor device of claim 15, wherein the first connector and the second connector are disposed on a second side of the two first-wires, wherein the second side of the two first-wires is opposite to the first side of the two first-wires.

17. The inductor device of claim 16, wherein the first connector is disposed on a first side of the two second-wires, and the third connector and the fourth connector are disposed on a second side of the two second-wires which is opposite to the first side of the two second-wires.

18. The inductor device of claim 17, wherein the first spiral wire is a duplicated projection of the second spiral wire based on an imaginary line which is a junction of the second side of the two first-wires and the first side of the two second-wires.

19. The inductor device of claim 17, wherein the first spiral wire is a mirror of the second spiral wire based on an imaginary line which is a junction of the second side of the two first-wires and the first side of the two second-wires.

* * * * *